Sept. 11, 1923.  
E. A. CONWAY  
CAN PUNCH  
Filed Dec. 5, 1921
1,467,608
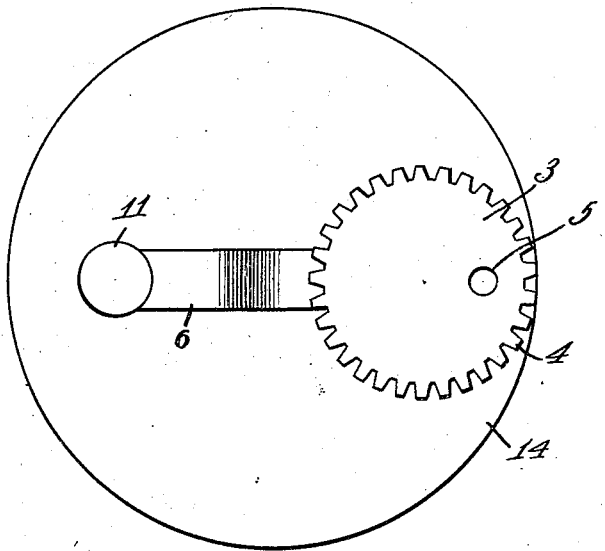
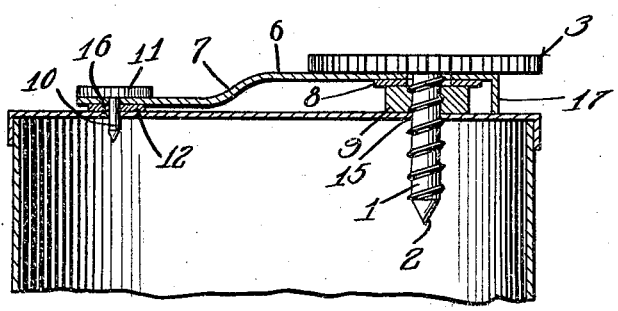
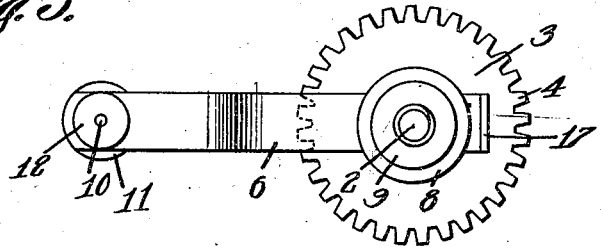
E. A. Conway, Inventor
By C. A. Snow & Co.
Attorney Patented Sept. 11, 1923.

1,467,608

UNITED STATES PATENT OFFICE.

ELISHA ASBURY CONWAY, OF WILLIAMSPORT, PENNSYLVANIA.

CAN PUNCH.

Application filed December 5, 1921. Serial No. 520,036.

*To all whom it may concern:*

Be it known that I, ELISHA A. CONWAY, a citizen of the United States, residing at Williamsport, in the county of Lycoming and State of Pennsylvania, have invented a new and useful Can Punch, of which the following is a specification.

This invention aims to provide novel means whereby one or more openings in a can, may be closed hermetically, thereby preventing the contents of the can from deteriorating, the device being of peculiar utility in connection with cans of the sort in which condensed milk and like liquids are contained, the milk or other liquid ordinarily being poured out of the can, without removing the head of the can entirely.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a can whereunto the device forming the subject matter of this application has been applied; Figure 2 is a longitudinal section of a can whereunto the device forming the subject matter of this application has been applied; and Figure 3 is a bottom plan view of the device per se.

In carrying out the invention there is provided a screw 1 having a pointed foot 2 and provided with an enlarged head 3 having teeth 4 whereby the screw may be rotated readily, the head 3 being provided with an opening 5, whereby the device may be hung up, when not in use. The screw 1 rotates freely in a laterally extended compressible spring arm 6 located beneath the head 3, the arm 6 being offset intermediate its ends, as shown at 7. The screw 1 carries a washer 8, abutting against one end of the spring arm 6 and forming a seat for a compressible gasket 9 surrounding the screw 1, the gasket 9 preferably being made of rubber. At its outer end, the arm 6 carries a closure, including a stud 10 extended through the arm, the stud being supplied with a head 11 which, preferably, is secured to the arm. A compressible gasket, made of rubber or like material, surrounds the stud 10 and abuts against the lower surface of the outer end of the arm 6.

The numeral 14 marks a can. In practical operation, an opening 15 is fashioned in the head of the can, through the instrumentality of the pointed foot 2 of the screw 1. A smaller opening 16 is fashioned in the head of the can, by the pointed foot 2 of the screw 1. The opening 15 is a pouring opening, whereas, the opening 16 is a vent opening, and the device forming the subject matter of this application is adapted to be used to seal both the pouring opening and the sealing opening.

When the screw 1 is threaded into the opening 15, the opening is closed, and is closed hermetically, because the gasket 12 is compressed against the head of the can. The stud 10 enters the vent opening 16, and this opening is sealed, owing to the fact that the stud carries the compressible gasket 12. It is obvious that when the screw 1 is threaded into the opening 15, the spring arm 6 will put pressure on the gasket 12, the gasket 9 being compressed, likewise, as hereinbefore explained. Owing to the fact that the arm 6 is offset intermediate its ends, as shown at 7, the gasket 12 need not be made so thick as the gasket 9. The arm 6 is provided at one end with a rectangularly disposed extension 17, adapted to engage the head of the can 14. This extension 17 prevents undue pressure from being placed on the gasket 9 and serves, also to steady and support the arm 6.

What is claimed is:—

In a device of the class described, a spring arm which is offset intermediate its extremities to dispose the end portions of the arm in different parallel planes, one end portion of the arm being supplied with a terminal extension disposed substantially at right angles thereto, said end portion being provided with an opening located close to the extension, a screw rotatable in the opening and having a turning head bearing against said end portion, a compressible gasket through which the screw is threaded, a washer on the screw and interposed between the gasket and said end portion of the arm, the washer constituting an abutment for the gasket and extending laterally beyond said end portion of the arm, a stud carried by the other end portion of the arm, and a compressible gasket on the stud and abutting against the last specified end portion of the arm, the distance between the screw and the extension, and the distance between the stud and the corresponding extremity of the arm being less than the distance between the stud and the screw.

In testimony that I claim the foregoing as my own, I have hereto affixed my signature in the presence of two witnesses.

ELISHA ASBURY CONWAY.

Witnesses:
 MRS. ELSIE BORDEN,
 LYLE E. SHANER.